United States Patent [19]
Perrella

[11] 4,236,656
[45] Dec. 2, 1980

[54] DISPENSING LID FOR A CONTAINER OF LOOSE SOLID PRODUCTS

[76] Inventor: Emilio Perrella, Viale S. Carlo 13, Segrate (Milan), Italy

[21] Appl. No.: 944,313

[22] Filed: Sep. 21, 1978

[30] Foreign Application Priority Data

Feb. 16, 1978 [IT] Italy ............................... 20330 A/78

[51] Int. Cl.³ ............................................. B65D 47/08
[52] U.S. Cl. ..................................... 222/517; 222/556
[58] Field of Search ......................... 222/494, 517, 556

[56] References Cited
U.S. PATENT DOCUMENTS

| | | | |
|---|---|---|---|
| 3,157,322 | 11/1964 | Bernhardt | 222/517 |
| 3,212,686 | 10/1965 | DiPierro et al. | 222/556 |
| 3,300,106 | 1/1967 | Chmela | 222/517 |

Primary Examiner—F. J. Bartuska
Attorney, Agent, or Firm—Holman & Stern

[57] ABSTRACT

A method is disclosed for molding lids for containers of the kind of those intended for holding tiny articles such as dragees, pills, tablets and the like. The lid is molded with the drawer which is intended for masking and unmasking an article-dispensing port, in a position which is different from the normal operative position of the drawer, so as to exploit the resiliency of the plastics material for having the drawer preloaded and causing it to press against the article-dispensing port when the latter is masked by the drawer. A small force is only required to lift the drawer and to swing it so as to unmask the article-dispensing port.

2 Claims, 7 Drawing Figures

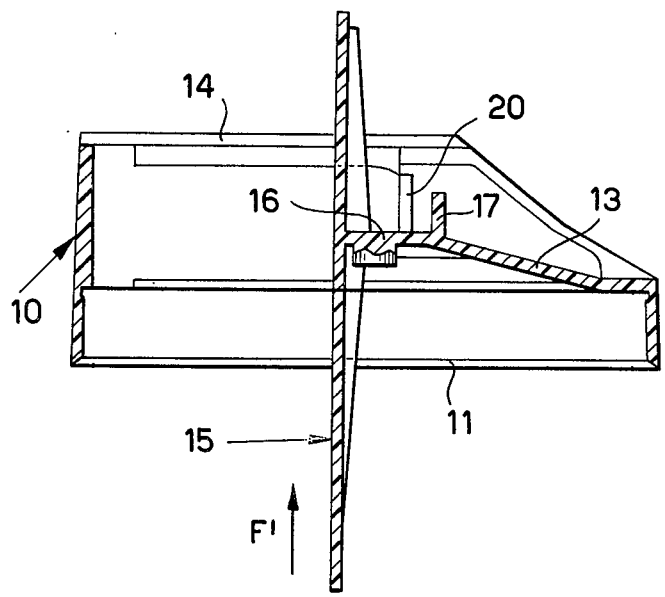
Fig. 1
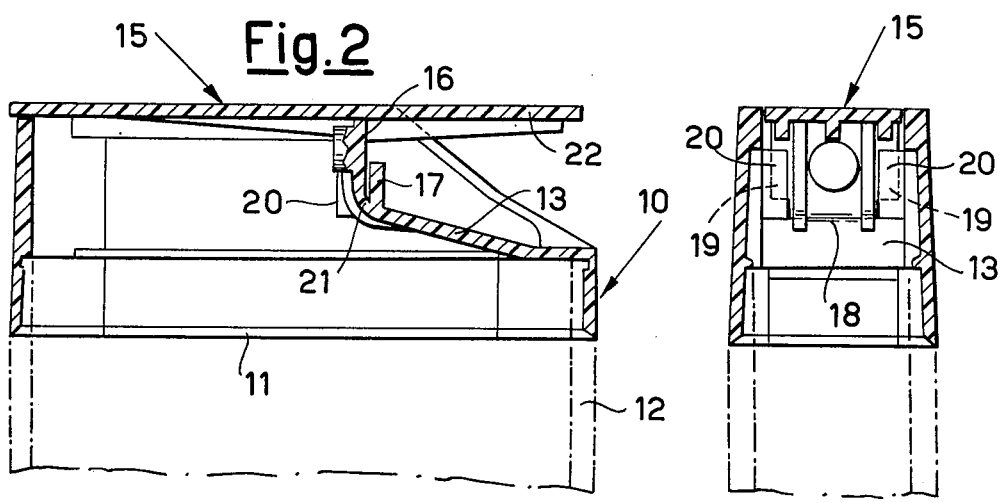
Fig. 2
Fig. 3
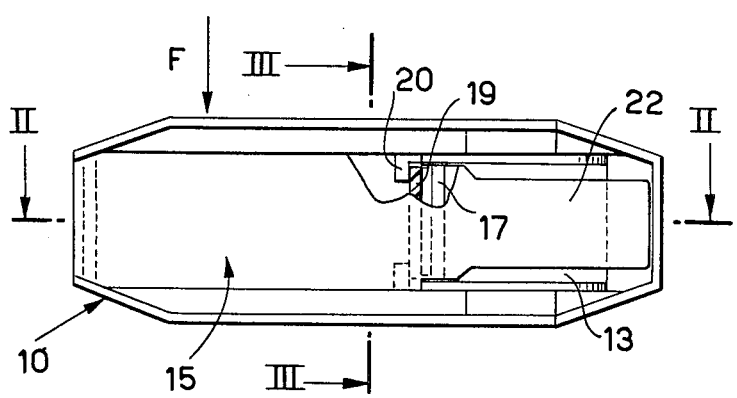
Fig. 4

DISPENSING LID FOR A CONTAINER OF LOOSE SOLID PRODUCTS

BRIEF SUMMARY OF THE INVENTION

This invention relates to a method for molding a plastics material lid of the kind used for closing containers for loose solid products to be dispensed controllably individually or in very small lots.

An example of such products are sweets in the form of dragees, tablets and the like.

To fulfill the requirement of controllably dispensing such products in addition to that of a convenient handling by a single hand by the user, there have become commonly used in view of their cheapness of molding, lids made as an entity of plastics material incorporating a dispensing device. Dispensing mechanisms are known which are formed by a drawer which can manually be shifted between an opening and a closing position of a dispensing port for the individual product units. Such a shift is carried out by swinging the drawer about a flexible hinged portion by exploiting the resilient yieldability of the plastics material. However, the dispensing devices known nowadays which exploit the resilient yieldability of the material for opening anf closing the drawer, do not give fully satisfactory performances due to the limited resilient efficiency of the material. As a matter of fact, the drawer has an elastic rebound which is rather slow from the open position to the closed one and, in addition, is incapable of affording a stable and appropriate closure of the dispensing port for the product. A certain difficulty is the result in dispensing the desired number of articles, together with the possibility that they escape from the container when the latter is placed in the vest pocket due to the unstable closure position of the drawer.

An object of the present invention is to overcome these defects by providing a lid of the kind referred to above in which the closure drawer has such a construction as to define a hinge capable of enabling the drawer to effect a snapping return motion forcibly to close the dispensing port for the article, to an extremely stable position, which can be modified at the user's will only, the latter applying with a finger to the drawer such a force which enables the drawer to be rotated towards the desired opening position.

To this end it has been envisaged to provide a lid the drawer of which can swing about a hinge which, characteristically, has a zone to which a preload has been applied, which is capable of considerably improving the resilient efficiency of the plastics material whenever it is further loaded by the swing of the drawer towards the opening position.

To obtain such a preloaded hinge according to the present invention, it has been envisaged to mold the drawer with its hinge in a position other than the operative closure position of the article dispensing port and subsequently to force, on the occasion of the unmolding, the drawer to said closure position, thus stressing the hinge in such a manner as to impress the desired preload thereto.

More exactly, according to the method of this invention, it is suggested to mold the drawer in a position which is substantially perpendicular to the operative closed position and with a hingeing tab (or hinge portion) connecting the drawer to the lid body; as the lid is unmolded, the drawer is rotated through 90° approximately with said hinge tab to the position of closure of the dispensing port, where the hinge tab is loosely engaged by latching means on the lid body in a preloaded condition which has been acquired by virtue of the forced rotation from the molding position to the operative position.

As a result, the hinge tab, latched loosely in the aforesaid preloading condition, is capable of ensuring to the drawer the necessary angle of swing about the hinge with a sudden elastic rebound to a closing position which is extremely stable by virtue of the preload of the material which ensures that an adequate closing force is applied to the drawer.

BRIEF DESCRIPTION OF THE SEVERAL VIEWS OF THE DRAWINGS

The structural and functional features of the invention and its advantages will become still more clearly apparent from the scrutiny of the ensuing exemplary description aided by the accompanying drawings, wherein:

FIG. 1 is a longitudinal cross-sectional view showing the molding position of a lid made according to this invention.

FIG. 2 is a longitudinal cross-sectional view taken along the line II—II of FIG. 4 and showing the lid of FIG. 1 with the drawer being rotated to the closed working position.

FIG. 3 is a cross-sectional view taken along the line III—III of FIG. 4.

FIG. 4 is a plan view of the lid with the drawer shown in fragmentary view.

DETAILED DESCRIPTION

Figure 5:
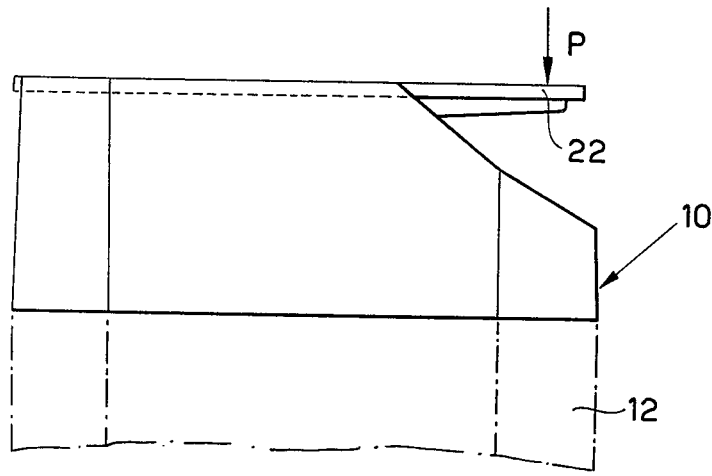
FIG. 5 is a side elevational view taken along the direction of the arrow F of FIG. 4.
Figure 6:
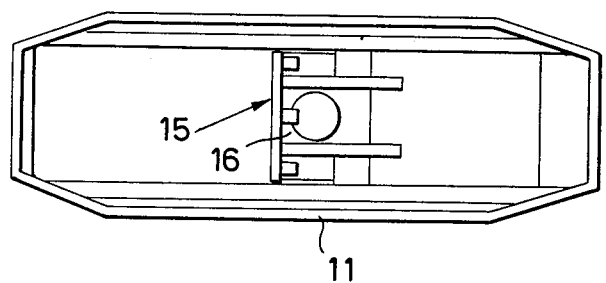
FIG. 6 is a view taken along the direction of the arrow $F_1$ of FIG. 1.

With reference to the drawings, the lid in question is generally shown at 10 and is structurally formed as an entity by molding in a plastics material, for example of the kind which is commonly used for foodstuffs.

The lid 10, in the example shown, has substantially the shape of a narrow and elongate dihedron which is fully open at its base, such as at 11, so as to be snugly slipped into the top window of a container 12 (FIG. 2).

At its own top, the lid 10 has a substantially stiff depressed zone 13 and a port 14 through which the articles held in the container 12 can be dispensed.

The port 14 is adapted to be closed by a drawer 15 which, according to the method of this invention, is molded in the vertical position shown in FIG. 1 and is connected to the depressed zone 13 by a hinge tab 16 which is extended from the zone 13 in correspondence with a transversal wall 17.

The drawer 15 is molded parallely of the narrow end walls of the lid so that there is no problem in unmolding the piece. Stated another way, the drawer 15 lies along the line of removal of the piece from the mold.

Figure 7:
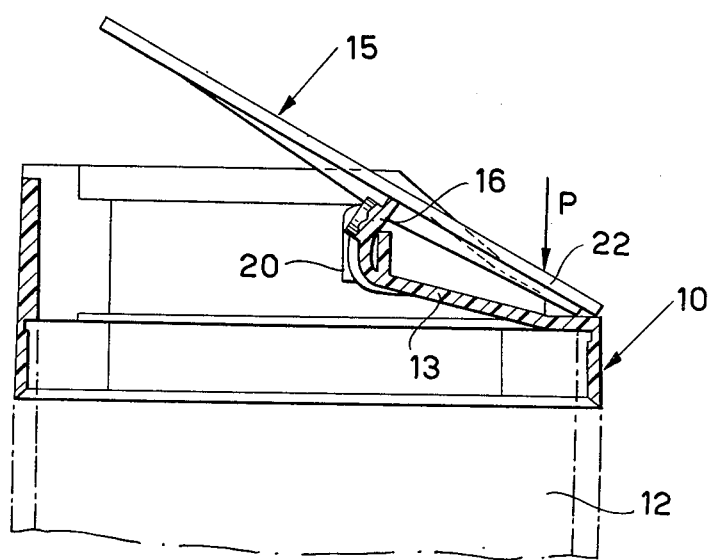
FIG. 7 is a view akin to that of FIG. 2 and shows the lid with the drawer being rotated in the working condition open.

It is to be noted, in addition, as can be seen in the drawings, that whereas the depressed zone 13, and also the transversal wall 17, are integral with the inner walls of the lid, the drawer 15 and the hinge tab 16 are separate from such inner walls: the only connection which exists is that of the hinge tab 16 with the depressed zone 13 in correspondence with the line of junction 18 (FIG. 3). As a result, the drawer 15, by exploiting the yieldability of the hinge tab 16, can be shifted, on the unmoulding, from the inoperative position of molding, i.e. : vertical of FIG. 1, to the operative horizontal position of FIG. 2, wherein a couple of lateral flags 19 of the tab 16 snap beyond a couple of respective latching teeth 20 which extend from the opposite longitudinal walls of the lid, a short distance apart from the transversal wall 17. Under these conditions, in the rotation from the position of FIG. 1 to that of FIG. 2, the hinge 16, especially in the arcuate shank 21, receives a certain preload, with pulled and compressed cross-sections, such preload being capable of pushing the drawer stably to the closure position of the dispensing port 14, with the flags 19 stably abutting the respective teeth 20. However, the hinge tab 16 is loosely latched between the teeth 20 and the transversal wall 17, so that it can be rotated by manual action on the tail portion of the drawer, in the direction of the arrow P (FIGS. 5 and 7) from the position of FIG. 2 to that of FIG. 7 to bring the drawer to an opening position of the port 14, through which the articles can be dispensed. During such a displacement, which is at any rate a small one, the arcuate shank 21 is further loaded to ensure that the drawer, as the force on the tail portion 22 is released, suddenly snaps to the closure position of FIG. 2.

Thus a plastics material lid has been provided, which is capable of fulfilling the requirements mentioned in the introductory part of this specification for being fitted with a drawer closing device which, by exploiting the resilient yieldability properties of the material, is capable of providing a snapping return of the drawer to a stable closure position of the dispensing port for the articles.

While a possible embodiment of the invention has been shown and described herein, it will be understood that modifications and changes may be introduced therein without departing from the scope of this invention as defined in and by the appended claims.

I claim:

1. A closure lid for open ended containers of loose solid particles molded of a single unitary piece of plastics material comprising a fully open base portion which is adapted to be attached to said open end of a container, a dispensing opening, a drawer for closing said dispensing opening, said drawer having a molded position and an operative position, said drawer being movable between an open position and a closed position when in said operative position, said drawer having a closure portion and a tail portion, an integral flexible hinge portion attached at one end perpendicular to said drawer between said closure portion and said tail portion and as its other end to a portion of the lid forming the bottom wall of a recessed portion of the lid disposed adjacent said tail portion to receive said tail portion when it is depressed to open said closure portion, said recess being open at its outer extremity, a transverse wall disposed at the juncture of said hinge portion and said bottom wall, said transverse wall being integrally attached at its ends to the side walls of said recessed portion and extending substantailly parallel to and substantially half the length of said hinge portion when in the closed position, said transverse wall being spaced from said hinge portion in the closed position a predetermined distance so that it contacts said hinge portion in the open position to resiliently urge said drawer towards the closed position, snap-latching means comprising tabs on said hinge portion extending toward said side walls, wings extending from said walls to engage said tabs when said drawer is in operating position to retain and pre-load said hinge in the operating position, the lid being molded with the drawer extending substantially parallel to and the hinge portion extending substantially perpendicular to the central axis of the lid so that when the drawer is in the operating position the hinge portion is pre-loaded to resiliently urge said drawer towards the closed position.

2. A lid according to claim 1, characterized in that said hinge portion in said operative position lies between said snap-latching means and said transverse wall of the lid.

* * * * *